US008527975B2

(12) United States Patent
Chess et al.

(10) Patent No.: US 8,527,975 B2
(45) Date of Patent: Sep. 3, 2013

(54) APPARATUS AND METHOD FOR ANALYZING SOURCE CODE USING MEMORY OPERATION EVALUATION AND BOOLEAN SATISFIABILITY

(75) Inventors: Brian Chess, Mountain View, CA (US); Sean Fay, San Francisco, CA (US); Ayee Kannan Goundan, Los Angeles, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1506 days.

(21) Appl. No.: 11/934,722

(22) Filed: Nov. 2, 2007

(65) Prior Publication Data

US 2009/0119648 A1 May 7, 2009

(51) Int. Cl.
*G06F 9/45* (2006.01)
*G06F 11/00* (2006.01)

(52) U.S. Cl.
USPC ............. 717/152; 717/141; 714/37; 714/38.1

(58) Field of Classification Search
None
See application file for complete search history.

(56) References Cited

U.S. PATENT DOCUMENTS 4,722,071 A * 1/1988 Gates et al. .................. 717/141
5,440,723 A 8/1995 Arnold et al.
5,502,815 A 3/1996 Cozza
5,581,696 A * 12/1996 Kolawa et al. .............. 714/38.1
6,728,939 B2 4/2004 Johannsen
6,880,154 B2 * 4/2005 Ghosh et al. ................. 717/151
6,912,700 B1 6/2005 Franco et al.
7,028,119 B2 * 4/2006 Hue ............................. 710/200
7,207,065 B2 4/2007 Chess et al.
7,266,793 B1 * 9/2007 Agmon ......................... 716/106
7,302,680 B2 * 11/2007 Collard et al. ............... 717/160
7,380,224 B2 5/2008 Franco et al.
7,406,592 B1 * 7/2008 Polyudov .......................... 713/2
7,606,974 B2 * 10/2009 Dai et al. ...................... 711/118
7,810,086 B2 * 10/2010 Murphy et al. ............... 717/159
7,836,434 B1 * 11/2010 Boucher ....................... 717/127
2001/0027383 A1 10/2001 Maliszewski
2002/0066024 A1 5/2002 Schmall et al.
2002/0073330 A1 6/2002 Chandnani et al.
2003/0005420 A1 * 1/2003 Ghosh et al. ................. 717/150
2003/0056149 A1 * 3/2003 Hue ............................... 714/38
2003/0120951 A1 6/2003 Cartside et al.
2003/0159063 A1 8/2003 Apfelbaum et al.
2004/0088501 A1 * 5/2004 Collard et al. ............... 711/154
2004/0133777 A1 7/2004 Kiriansky et al.
2004/0255163 A1 12/2004 Swimmer et al.
2004/0255277 A1 12/2004 Berg et al.
2004/0260940 A1 12/2004 Berg et al.
2004/0268322 A1 12/2004 Chow et al.

(Continued)

OTHER PUBLICATIONS

Brian V. Chess, Improving Computer Security Using Extended Static Checking, IEEE Symposium on Security and Privacy, May 2002, pp. 1-14.*

(Continued)

*Primary Examiner* — Tuan Dam
*Assistant Examiner* — Zheng Wei

(57) ABSTRACT

A computer readable storage medium includes executable instructions to identify a memory operation in target source code. A set of constraints associated with the memory operation are developed. The constraints are converted into a Boolean expression. The Boolean expression is processed with a Boolean satisfiability engine to determine whether the memory operation is potentially unsafe.

15 Claims, 3 Drawing Sheets

Parse Program 200
Build Model 202
Identify Memory Operations 300
Select Operation 302
All Ops Selected? 304 Yes Done
No
Op Always Safe? 306 Yes
No
Op Safe for Some Inputs? 308 No
Report Unsafe Op 314
Yes
Test Boundary Conditions 310
Unsafe Op? 312 Yes No

(56) References Cited

U.S. PATENT DOCUMENTS

| | | | | |
|---|---|---|---|---|
| 2005/0010806 | A1 | 1/2005 | Berg et al. | |
| 2005/0015752 | A1 | 1/2005 | Alpern et al. | |
| 2005/0028002 | A1 | 2/2005 | Christodorescu et al. | |
| 2005/0273860 | A1 | 12/2005 | Chess et al. | |
| 2007/0006197 | A1* | 1/2007 | Murphy et al. | 717/151 |
| 2007/0050774 | A1* | 3/2007 | Eldson et al. | 718/104 |
| 2007/0198772 | A1* | 8/2007 | Dai et al. | 711/108 |
| 2008/0250376 | A1 | 10/2008 | Burch et al. | |

OTHER PUBLICATIONS

Ashcraft et al., Using Programmer—Written Compiler Extensions to Catch Security Holes, IEEE Symposium on Security and Privacy,2002, pp. 1-17.*

Bush et al., A static analyzer for Pinging dynamic programming errors, Software—Practice and Experience 2000, pp. 1-28.*

Moskewicz et al., "Chaff: Engineering an Efficient SAT Solver," Department of EECS, UC Berkeley, Berkeley, California.

Xie et al., "Scalable Error Detection using Boolean Satisfiability," Computer Science Department, Stanford University, Stanford, California.

Chess, et al., U.S. Appl. No. 11/934,717, filed Nov. 2, 2007 for Apparatus and Method for Analyzing Source Code Using Path Analysis and Boolean Satisfiability. Office Action mailed Jul. 7, 2010.

http://java.sun.com/docs/books/jls/second_edition/html/expressions.doc.html#20448 ~ "Publication date unknown but prior to Dec. 10, 2004" pp. 1-14.

http://java.sun.com/i2se/1.4.2/docs/api/java/lang/reflect/package-surnmary.htm ~ Publication date unknown but prior to Dec. 10, 2004 pp. 1-2.

http://java.sun.com/i2se/1.4.2/docs/api/java/rmi/package-summary.html ~ Publication date unknown but prior to Dec. 10, 2004 pp. 1-3.

http://java.sun.com/products/ejb/docs.html ~ "Publication date unknown but prior to Dec. 10, 2004" pp. 1-4.

http://java.sun.com/products/jdbc/reference/index.htnl ~ "Publication date unknown but prior to Dec. 10, 2004" pp. 1-2.

Final Office Action dated Dec. 22, 2010 ~ U.S. Appl. No. 11/934,717, filed Nov. 2, 2007.

Non-Final Office Action dated Jul. 7, 2010 ~ U.S. Appl. No. 11/934,717, filed Nov. 2, 2007.

* cited by examiner

APPARATUS AND METHOD FOR ANALYZING SOURCE CODE USING MEMORY OPERATION EVALUATION AND BOOLEAN SATISFIABILITY

CROSS-REFERENCE TO RELATED APPLICATION

This application is related to the commonly owned patent application entitled "Apparatus and Method for Analyzing Source Code Using Path Analysis and Boolean Satisfiability", filed Nov. 2, 2007, Ser. No. 11/934,317.

BRIEF DESCRIPTION OF THE INVENTION

This invention relates generally to the static analysis of source code. More particularly, this invention relates to using memory operation evaluation and Boolean satisfiability in a static analysis of source code.

BACKGROUND OF THE INVENTION

U.S. Pat. No. 7,207,065, entitled "Apparatus and Method for Developing Secure Software" describes techniques for the static analysis of source code. The patent is owned by the assignee of the current invention and its contents are incorporated herein by reference.

Boolean satisfiability, often referred to as SAT, is a decision problem defined with Boolean operators and variables. Boolean satisfiability determines whether for a given expression there is some assignment of a true or false value to the variables that will make the entire expression true. A formula of propositional logic is said to be satisfiable if logical values can be assigned to its variables in a way that makes the formula true.

Consider formulas built from variables including the conjunction operator (+), disjunction operator (&), and the negation operator (−). For example, the formula (a+b) & −c is read as "a or b and not c". A SAT solver or Boolean satisfiability engine is a set of computer executable instructions that accepts a Boolean equation and responds in one of three ways:

1. Satisfiable. The SAT solver has found a set of variable assignments such that the equation evaluates to true.
2. Unsatisfiable. There is no set of variable assignments that cause the equation to evaluate to true.
3. Failed. The SAT solver cannot determine whether or not a satisfying assignment exists.

If the SAT solver reports that the formula is satisfiable, it also returns a set of variable assignments that satisfy the formula. For example, the formula (a+b) & −c is satisfied by the assignments (a=false, b=true, c=false).

By convention, SAT solvers accept formulas in Conjunctive Normal Form (CNF). CNF formulas comprise a set of clauses where every clause is the disjunction of a set of variables or negations of the variables. The formula is the conjunction of all of the clauses. By convention, CNF formulas are written with one clause per line. For example, the formula (a+b) & −c can be expressed in CNF notation as:

(a+b)

(−c)

For this example, the shortest unsatisfiable CNF formula is:

(a)

(−a)

The kinds of CNF formulas that are useful for solving real-world problems are often very large. They may contain thousands or millions of clauses and thousands or hundreds of thousands of variables. Generally speaking, the larger a CNF formula is the more time the SAT solver will take to produce a result. Effective use of a SAT solver requires generating formulas that are as compact as possible while still expressing the essence of the problem at hand.

Because they operate on Boolean variables, SAT solvers efficiently process problems that are modeled at the bit level. The price for this precision is that higher-level operations must all be represented in bitwise form. Such operations include addition and subtraction, mathematical comparisons, and conversion between data types.

It would be desirable to employ a SAT solver or Boolean satisfiability engine in the static analysis of source code. More particularly, it would be desirable to utilize a Boolean satisifiability engine in connection with solving particular static analysis issues, such as path analysis or the analysis of memory operations.

SUMMARY OF THE INVENTION

The invention includes a computer readable storage medium with executable instructions to identify a memory operation in target source code. A set of constraints associated with the memory operation are developed. The constraints are converted into a Boolean expression. The Boolean expression is processed with a Boolean satisfiability engine to determine whether the memory operation is potentially unsafe.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
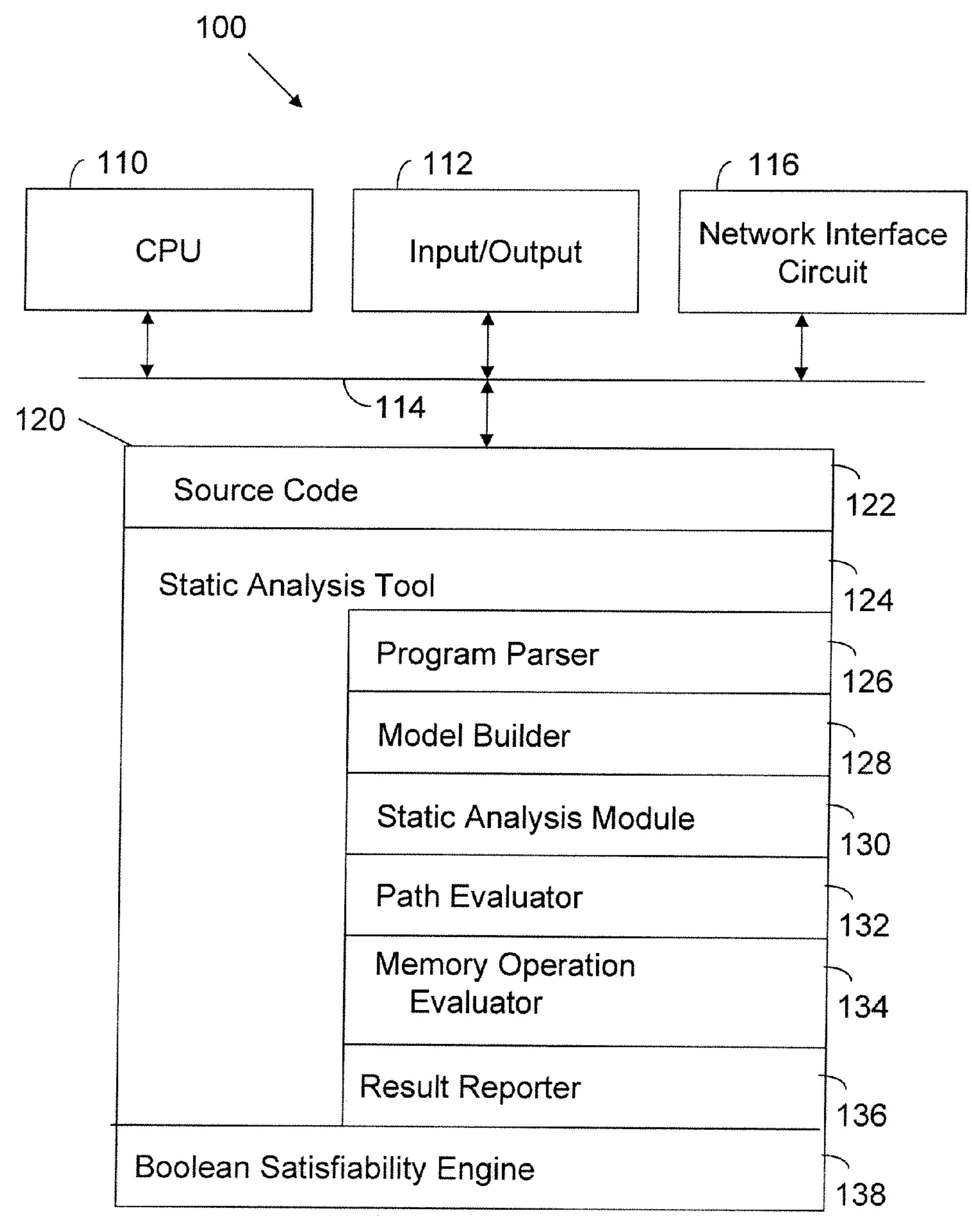
FIG. 1 illustrates a computer configured in accordance with an embodiment of the invention.

FIG. 1 illustrates a computer 100 configured in accordance with an embodiment of the invention. The computer 100 includes standard components, such as a central processing unit (CPU) 110 and input/output devices 112 connected via a bus 114. The input/output devices 112 may include a keyboard, mouse, display, printer and the like. A network interface circuit 116 is also connected to the bus 114 to provide connectivity to a network (not shown). Thus, the computer 100 may operate in a networked environment.

A memory 120 is also connected to the bus 114. The memory 120 includes executable instructions to implement operations of the invention. The memory 120 stores a set of source code 122 that is analyzed in accordance with techniques of the invention. The memory 120 also stores a static analysis tool 124 configured to implement operations of the invention. The static analysis tool 124 may be configured to implement operations such as those described in the previously referenced U.S. Pat. No. 7,207,065.

By way of example, the static analysis tool 124 may include a program parser 126 to parse source code 122 using standard techniques. In addition, a model builder 128 may use standard techniques to build a model of the source code 122. A static analysis module 130 uses known techniques to analyze the model. The standard operations of the static analysis module 130 are augmented in accordance with the techniques of the invention. In particular, a path evaluator 132 includes executable instructions to identify infeasible paths through the source code. The path evaluator 132 invokes the Boolean satisfiability engine 138, which identifies infeasible paths. The identification of infeasible paths simplifies the static analysis process by avoiding the analysis of such paths. In this way, the static analysis tool 124 reduces its computational load and reports fewer false bugs.

A memory operation evaluator 134 includes executable instructions to identify memory operations defined in the source code under analysis. Those memory operations are then processed using the Boolean satisifiability engine 138, as discussed below. The static analysis tool includes a standard result reporter 136 to report the results of a static analysis performed in accordance with the invention.

The Boolean satisfiability engine or SAT solver 138 is shown as a separate set of executable instructions. This is done to emphasize that the Boolean satisfiability engine 138 may be a prior art Boolean satisfiability engine. The invention is not directed toward the Boolean satisfiability engine per se, rather the invention is directed toward its utilization in the manner described herein. The Boolean satisfiability engine 138 may be incorporated into the static analysis tool 124. Indeed, there are any numbers of ways to combine or implement the modules disclosed in FIG. 1. The modules may be combined, further divided, distributed across a network, etc. It is the operations of the invention that are significant, not the particular manner or location for implementing those operations.

Figure 2:
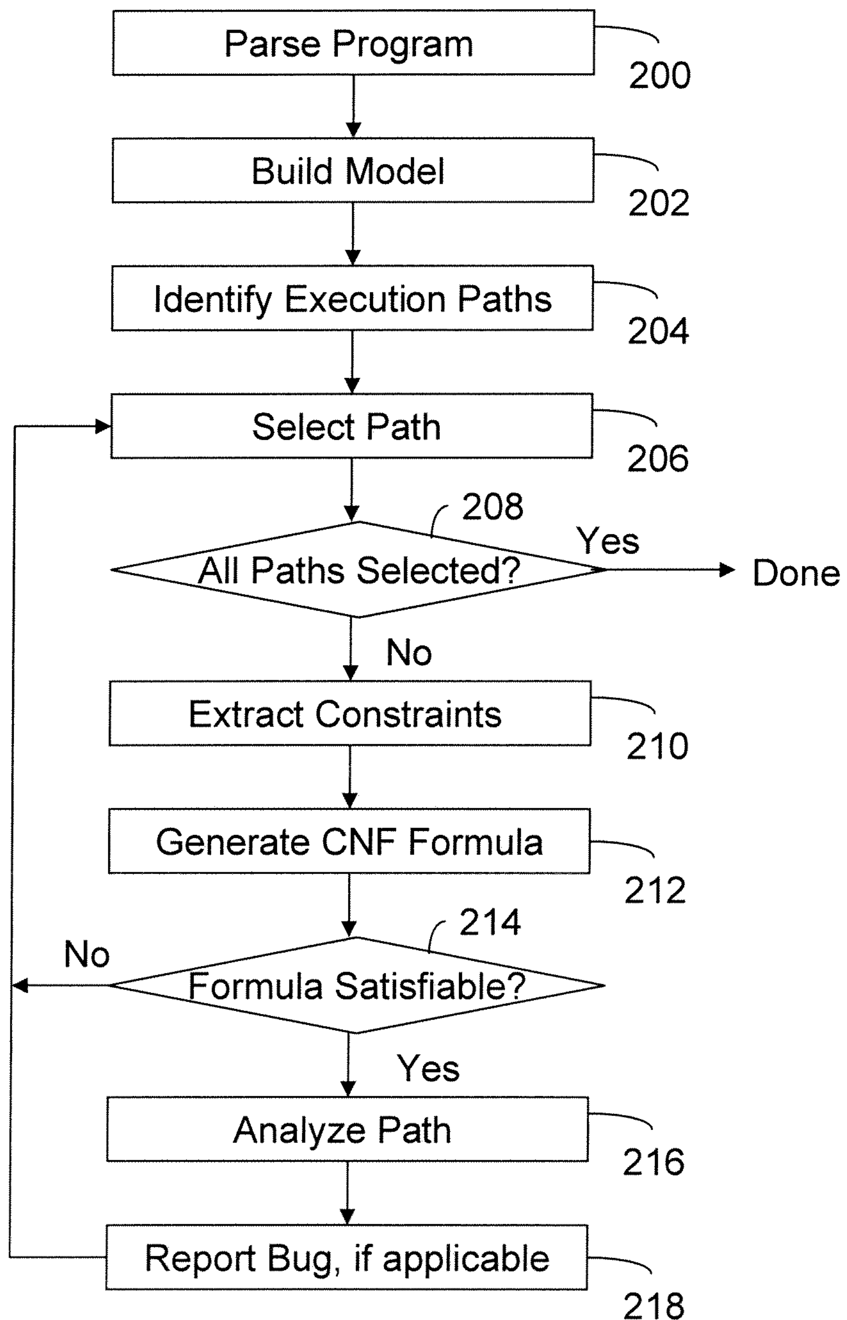
FIG. 2 illustrates processing operations associated with path analyses utilized in accordance with an embodiment of the invention.

FIG. 2 illustrates processing operations associated with a path analysis embodiment of the invention. Initially, a program is parsed 200, for example using the program parser 126. A model of the program is then built 202, for example using the model builder 128. Execution paths of interest are then identified 204. Standard static analysis tools may be used to identify the paths of interest. Alternately, the path evaluator 132 may be configured to identify paths of interest.

A path is then selected 206. A decision is then made to determine whether all the paths of interest have been selected 208. On the first pass, all paths are not selected (208—NO), so processing continues. Constraints associated with the path are then extracted 210. A CNF formula is then generated for the constraints 212. The operations of blocks 206-212 may be implemented with the path evaluator 132 or another resource in the static analysis tool 124. If the formula is not satisfiable (214—NO), then processing returns to block 206. The Boolean satisfiability engine 138 is invoked by the path evaluator 132 to make the feasibility determination. As previously indicated, when a path is not feasible, subsequent static analysis processing may be avoided. This reduces computational load and the production of false bug reports. If a path is satisfiable, then the path is analyzed 216. The static analysis module 130 is used to analyze the path and report bugs, if necessary 218. Control then returns to block 206. This processing is repeated until all paths are processed.

The operations of FIG. 2 are more fully appreciated with a specific example. Consider the following source code that includes a function a call to open( ) when the condition flag==1 is true.

```
1 void function f(int flag, char* name) {
2   int x;
3   if (flag == 1)
4     x = open(name, O_CREAT, 0644);
5   return;
6 }
```

Because the function calls open( ) but never calls close( ), it contains a resource leak. A resource leak can cause the program to run out of the leaked resource, which in turn can cause the program to crash or otherwise misbehave.

A static analysis tool that explores possible execution paths can identify this bug. For the code above, the tool might report "Resource leak in function f when the program executes the following trace: 1, 2, 3, 4, 5."

Now consider a more complex code example.

```
1   void function g(int flag, char* name) {
2     int x;
3     int closeIt = 0;
4     if (flag == 1) {
5       x = open(name, O_CREAT, 0644);
6       closeIt = 1;
7     }
8     if (closeIt == 1)
9       close(x);
10    }
11    return;
11  }
```

This function makes a call to close( ), but only when the predicate closeIt==1 is true. A static analysis tool that does not track variable values might produce the following bug report: "Resource leak in function g when the program executes following trace: 1, 2, 3, 4, 6, 7, 8, 11." In other words, the tool has chosen a control flow path that does not execute the call to close( ) on line 9. This bug report is a false alarm because the program cannot carry out the set of instructions the bug report suggests. The sequence is impossible because any execution path that includes line 5 (the call to open( )) will also include line 6 (where the variable closeIt is set to the value 1). By executing line 6, the program guarantees that the predicate closeIt==1 will evaluate to true on line 8. The result is that whenever the program calls open( ) it also calls close( ), and therefore it does not contain a bug.

The hypothetical trace (1, 2, 3, 4, 6, 7, 8, 11) is an infeasible path, also known as a false path. It is a sequence of operations that can never be carried out by the program when it runs. An ideal static analysis tool would not report a bug along an infeasible path.

Checking the feasibility of the path in the example above results in the following constraints:

| | |
|---|---|
| flag = 1 | (implied by the branch taken at line 4) |
| closeIt = 1 | (implied by the assignment on line 6) |
| not closeIt = 1 | (implied by the branch not taken at line 8) |

The conjunction of these constraints is then converted to a Boolean formula. An example of such a conversion in CNF follows. This example assumes a theoretical language where int is a 2-bit unsigned type, so flag and closeIt are each represented using 2 boolean variables.

D+−A

−D+A

A+−C
E+B
−E+−B
B+−C
−A+−B+C
I+F
−I+F
F+−H
J+G
−J+−G
G+−H
−F+−G+H
I+−K
−I+K
K+−M
J+L
−J+−L
L+−M
−K+−L+M
C+−N
H+−N
−M+−N
−C+−H+M+N
N

Where the mapping of constraint variable to bit vector is as follows:

flag: [DE]
closeIt: [IJ]

Another embodiment of the invention includes the use of the Boolean satisfiability engine 138 in connection with the analysis of unsafe memory operations. An unsafe memory operation occurs when a program attempts to read or write outside the bounds of an allocated piece of memory. An unsafe memory operation can cause a program to crash or to compute an incorrect result. It can also leave the door open to a buffer overflow attack in which an attacker intentionally causes the program to write outside allocated bounds in order to inject code into the program or otherwise corrupt the state of the program. A memory operation is "safe" if it cannot cause the program to write outside the bounds of an allocated piece of memory.

Figure 3:
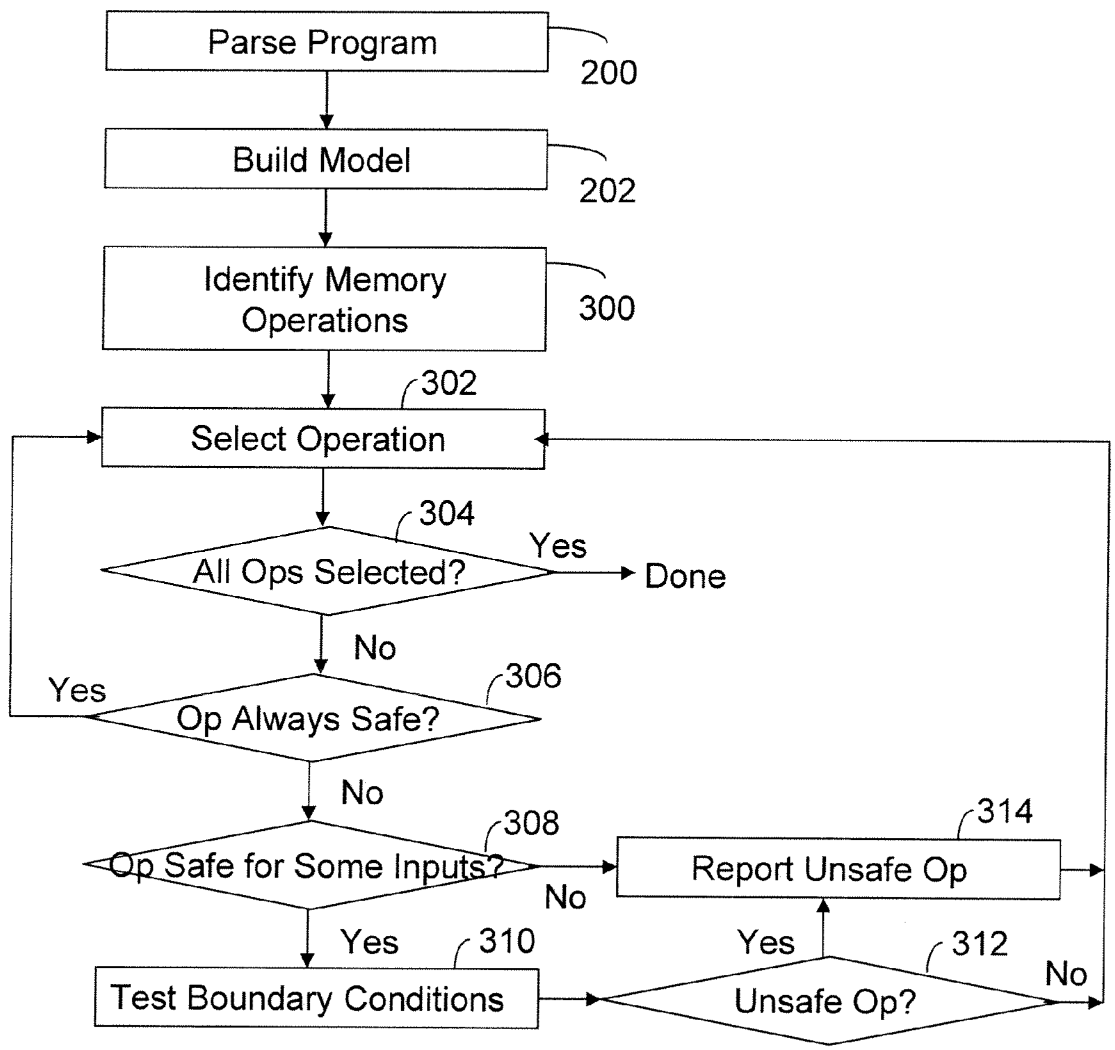
FIG. 3 illustrates processing operations associated with the analysis of memory operations in accordance with an embodiment of the invention.

An embodiment of the invention detects unsafe memory operations using the Boolean satisfiability engine 138. FIG. 3 illustrates processing operations associated with this embodiment. The first two processing operations 200 and 202 are the same as those described in connection with FIG. 2. Next, memory operations are identified 300. The memory operation evaluator 134 or another resource in the static analysis tool 124 may be used to implement this operation. As discussed below, the memory operations are characterized as a set of constraints. The constraints are then used to express formulas characterizing memory operations.

An operation is then selected 302. If the operation is not the last operation (304—NO), processing proceeds to determine whether the operation is always safe 306. The memory operation evaluator 134 invokes the Boolean satisfiability engine 138 to make this determination. If the operation is always safe (306—YES), then the memory operation evaluator 134 returns control to block 302, otherwise (306—NO), control proceeds to block 308. It is then determined whether the operation is safe for some inputs 308. If not (308—NO), then the unsafe operations are reported 314, for example using the result reporter 136. If the operation is safe for some inputs (308—YES), boundary conditions are tested 310. The memory operation evaluator 134 then determines whether there are unsafe operations 312. If so (312—YES), the unsafe operations are reported 314 and control returns to block 302.

If not (312—NO), control immediately returns to block 302. The memory operation evaluator repeats these operations until all operations are selected (304—YES), at which point processing is completed.

The operations of FIG. 3 are more fully appreciated in connection with a specific example. The following function always writes one element past the end of the space allocated for the array arr, regardless of the function's parameter values. In other words, any time line 4 is invoked, a memory safety error will occur.

```
1  void q(int z) {
2     int arr[1];
3     arr[0] = z; // this is a safe operation
4     arr[1] = z; // this is an out of bounds write
5  }
```

In order to catch errors like this one, the invention converts the statements in each function into a set of constraints representing the constant values and control structures for the function. The base set of constraints for the function above is:

arr.size=1 (derived from the declaration int arr[1])

This set of constraints is used as the basis for a set of formulas—one formula for each array read and write operation in the program. The formulas, for example expressed in CNF, are processed by the Boolean satisfiability engine 138 to identify an unsafe operation.

In order to generate the formula for a read or write operation, constraints are added to force the operation out of bounds. For the function above, the constraints for the write operation on line 3 are:

0>=arr.size (the index value must be greater than or equal to the array size)

This converts to a simplified 2-bit model in CNF as follows:

D+−B+A
D+B+−A
−D+−B
−C+−A
C+A
B
arr.size: [CD]

The Boolean satisfiability engine 138 determines that the formula is unsatisfiable (it always evaluates to false). Thus, this operation is safe.

For the operation on line 4, a check is made to see if the operation may be unsafe. The following constraints may be used:

arr.size=1
1>=arr.size

The Boolean satisfiability engine 138 determines that this formula is satisfiable. Therefore, the operation can be unsafe. It is then determined if the operation can be safe. The base set of constraints is supplemented to specify a constraint that requires the operation to be in bounds:

1<arr.size

These constraints are contradictory. Therefore the Boolean Satisfiability engine 138 reports that the formula is unsatisfiable. This indicates that there is no set of input values for which the array access is in bounds, so the result reporter 136 reports a bug in the target program.

If the operations of blocks 306 and 308 are inconclusive, boundary conditions are tested 310. In particular, the memory operation evaluator 134 determines a set of edge cases that are likely to be possible at run time. The memory operation evaluator 134 then creates and tests a series of formulas that represent the boundary conditions. Each of these formulas is made up of three pieces:

1. Base constraints derived from the constructs in the function.
2. Constraints requiring the operation to be within bounds.
3. Additional constraints that limit function inputs and global variables to values that might carry when the program runs.

The set of constraints is converted to CNF and the constraints are submitted to the Boolean satisfiability engine 138. The memory operation evaluator 134 implements these operations. If any formula is reported unsatisfiable by the Boolean satisfiability engine, then the operation cannot be safe when that boundary condition occurs. The result reporter 136 reports the condition as a likely bug.

In one embodiment, a set of boundary conditions to test is determined via two techniques:

1. Examining the set of branch predicates in the function to infer boundary conditions expected by the programmer.
2. Examining the contexts in which the function is used to determine a set of known possible values for function inputs (both sizes of input buffers and values of input variables).

Step one involves examining each branch predicate in the function and converting it into a set of distinct boundary conditions. For equality and inequality tests, a boundary condition is generated for the value that will cause the test to succeed. The following code fragment, for example, will generate the boundary constraint a=b.

```
if (a == b) {
  ...
} else {
  ...
}
```

For inequality tests, boundary conditions are generated for the largest/smallest value that will cause the test to fail, and for the largest/smallest value that will cause the test to succeed. The following code generates two boundary conditions, listed below.

```
if (a <= x) {
  ...
} else {
  ...
}
Bondary Constraints:
      a = x
and
      a = x − 1
```

The following example shows how these boundary constraints can be used to detect unsafe code.

```
int k(int idx) {
  int arr[10];
  setValues(arr, 10);
  if (idx > 10)
    return arr[idx]; // an out of bounds read
}
```

In this case, the predicate (idx>10) causes the boundary condition [idx=11] to be tested, generating the following constraint set:

```
arr.size = 10    (base constraint)
idx < arr.size   (safety constraint)
idx = 11         (boundary constraint)
```

The formula produced from these constraints is unsatisfiable and leads to a bug report. In the next step, call sites for a function are examined. If statically-sized buffers or constant values are passed to the function, boundary conditions based on those values are generated. In the following example, the call on line 3 is seen to pass a statically-sized array (of size 10) as the first argument to the function p. This induces the following boundary constraint to be tested when examining the read operation on line 6:

p.size=10

Which combines with the constraint

20<p.size to produce an unsatisfiable formula. Therefore, line 6 performs an unsafe memory operation when invoked in the context of line 3.

```
1  int m(int idx) {
2    int arr[10];
3    p(arr);
4  }
5  int p(int* p) {
6    return p[20];   // error when called in the context of m
7      }
```

The primary advantage to using a Boolean satisfiability engine is the bit-level precision offered. However, creating a full bitwise model of all program operations of interest can be expensive. In some cases the model is optimized and sent to the Boolean satisfiability engine by using a smaller number of bits to represent a value than the actual representation at runtime. This is based on the observation that typical memory operations in a program deal with quantities much smaller than what can be represented by the default integer type. A 32-bit unsigned integer variable can represent values greater than 4 billion, while memory operations rarely deal with quantities over a million bytes. Thus, in most cases, representing buffer sizes with 20 bits rather than 32 bits yields the same result from the Boolean satisfiability engine. This technique is referred to as "bit width limiting". It reduces the number of variables and the number of clauses in the generated formulas.

Bit width limiting can lead to erroneous results if the program uses constant values that require more than 20 bits to represent. Such situations are rare. Therefore, it is commonly worth trading off some precision for significant performance improvements.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD- ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable storage medium, comprising executable instructions to:

identify a memory operation in target source code;

develop a set of constraints associated with the memory operation, wherein the set of constraints includes base constraints derived from the target source code and additional constraints for forcing the memory operation to be out of bounds;

convert the constraints into a Boolean expression; and process the Boolean expression with a Boolean satisfiability engine to determine whether the memory operation is potentially unsafe by executing instructions to:

determine whether the memory operation is always safe;

determine whether the memory operation is safe for a number of inputs if the memory operation is determined to be not always safe; and test boundary conditions for the memory operation if the memory operation is safe for at least some of the number of inputs, wherein the boundary conditions include the base constraints, constraints requiring the memory operation to be within bounds, and constraints for runtime limitations.

2. The computer readable storage medium of claim 1 wherein the Boolean expression is expressed in Conjunctive Normal Form (CNF).

3. The computer readable storage medium of claim 1 further comprising executable instructions to test the boundary conditions to determine if the memory operation is always safe.

4. The computer readable storage medium of claim 3 further comprising executable instructions to determine unsafe operations.

5. The computer readable storage medium of claim 3 further comprising executable instructions to report unsafe operations.

6. The computer readable storage medium of claim 3 further comprising executable instructions to test boundary conditions from base constraints derived from constructs in a memory operation.

7. The computer readable storage medium of claim 3 further comprising executable instructions to test boundary conditions derived from constraints requiring an operation to be within bounds.

8. The computer readable storage medium of claim 3 further comprising executable instructions to test boundary conditions from additional constraints that limit function inputs and global variables to values that will carry during execution.

9. The computer readable storage medium of claim 3 further comprising executable instructions to test boundary conditions from examining branch predicates in a function to infer expected boundary conditions.

10. The computer readable storage medium of claim 3 further comprising executable instructions to test boundary conditions from examining the contexts in which the function is used to determine a set of known possible values for function inputs.

11. The computer readable storage medium of claim 1 further comprising executable instructions to bit width limit the input to the Boolean satisfiability engine.

12. The computer readable storage medium of claim 1 further comprising executable instructions to parse the target source code.

13. The computer readable storage medium of claim 1 further comprising executable instructions to build a model of the target source code.

14. The computer readable storage medium of claim 1 further comprising instructions to develop the set of constraints representing constant values and control structures for the memory operation.

15. The computer readable storage medium of claim 1 further comprising instructions to convert the constraints into the Boolean expression that force the memory operation out of bounds of the memory operation.

* * * * *

UNITED STATES PATENT AND TRADEMARK OFFICE

CERTIFICATE OF CORRECTION

PATENT NO. : 8,527,975 B2
APPLICATION NO. : 11/934722
DATED : September 3, 2013
INVENTOR(S) : Brian Chess et al.

It is certified that error appears in the above-identified patent and that said Letters Patent is hereby corrected as shown below:

In the Specification

In column 1, line 12, delete "11/934,317." and insert -- 11/934,717. --, therefor.

Signed and Sealed this
Fourteenth Day of January, 2014

Michelle K. Lee

Michelle K. Lee
*Deputy Director of the United States Patent and Trademark Office*